United States Patent [19]
Langenstein

[11] 3,951,471
[45] Apr. 20, 1976

[54] RECIRCULATING BALL BEARING ASSEMBLY FOR FORK LIFT MAST UNITS

[75] Inventor: Joseph G. Langenstein, Edelstein, Ill.

[73] Assignee: Caterpillar Tractor Co., Peoria, Ill.

[22] Filed: May 7, 1975

[21] Appl. No.: 575,302

[52] U.S. Cl. .................................. 308/6 C; 187/9 E
[51] Int. Cl.² .......................................... F16C 29/06
[58] Field of Search .............. 308/6 R, 6 C; 187/95, 187/9 R, 9 E

[56] References Cited
UNITED STATES PATENTS

| | | | |
|---|---|---|---|
| 2,664,970 | 1/1954 | Warshaw | 308/6 C X |
| 3,353,875 | 11/1967 | Karge | 308/6 R |
| 3,819,078 | 6/1974 | Walsh | 308/6 R |
| 3,844,628 | 10/1974 | McCloskey | 308/6 C |

*Primary Examiner*—M. H. Wood, Jr.
*Assistant Examiner*—Gene A. Church
*Attorney, Agent, or Firm*—Phillips, Moore, Weissenberger Lempio & Strabala

[57] ABSTRACT

An anti-friction, recirculating ball bearing assembly of minimum thickness particularly contemplated for use between the structural beams of relatively movable upright sections in a fork lift mast unit, each assembly including a first race member having a substantially flat bearing surface and a bearing carrier plate arranged adjacent the first race member and forming therewith a pair of closed loop paths of elongated configuration, each path having a straight line, bearing portion penetrating entirely through the bearing carrier plate, a recirculating path portion being formed partially by the bearing carrier plate and the bearing surface of the first race member. In one embodiment, a flat bearing surface opposite the first race member is formed by a second race member. In another embodiment, the flat bearing surface opposite the first race member is formed by one of a pair of elements supported in relatively movable relation by the bearing assembly. In yet another embodiment, the carrier plate is secured to the first race member together with an intermediate spacer plate, the carrier plate and first race member forming only a single closed loop bearing path.

25 Claims, 9 Drawing Figures

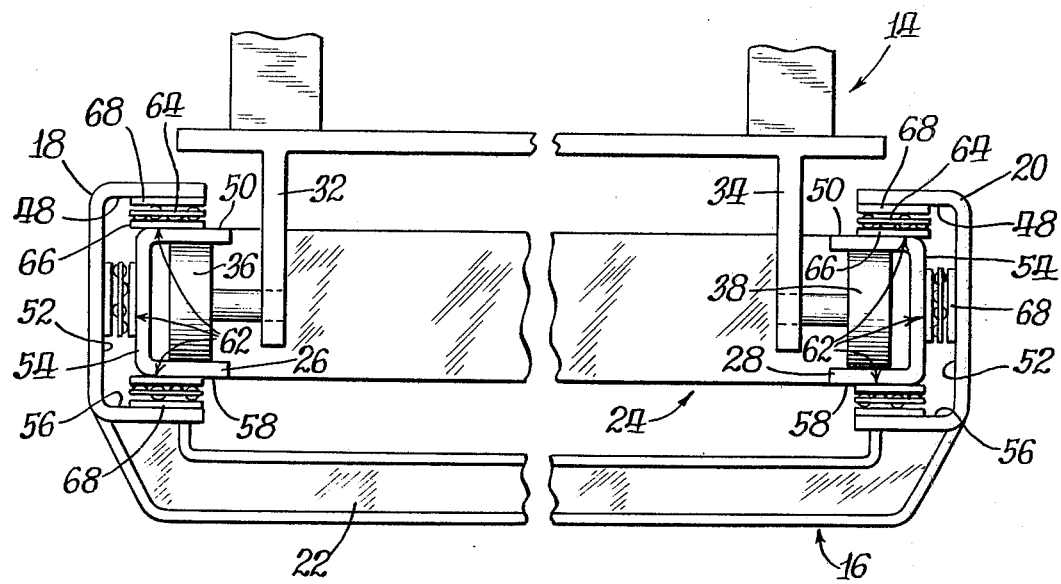
Fig_2A_
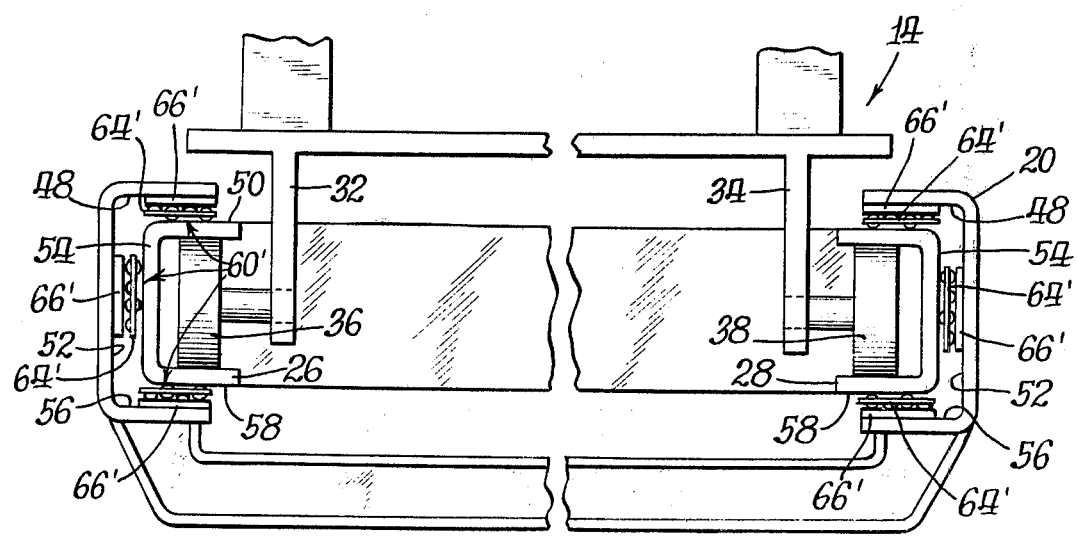
Fig_3_

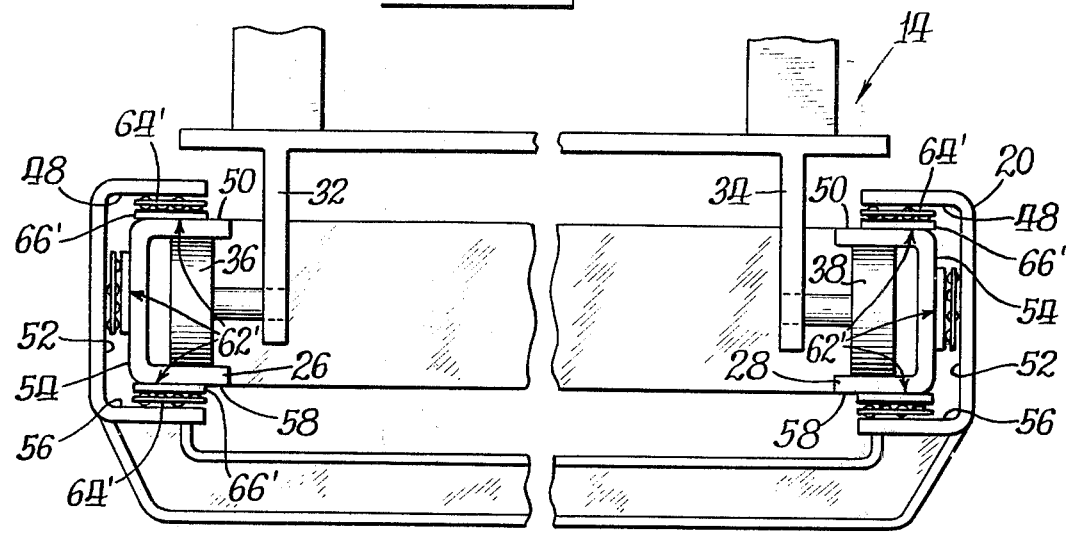
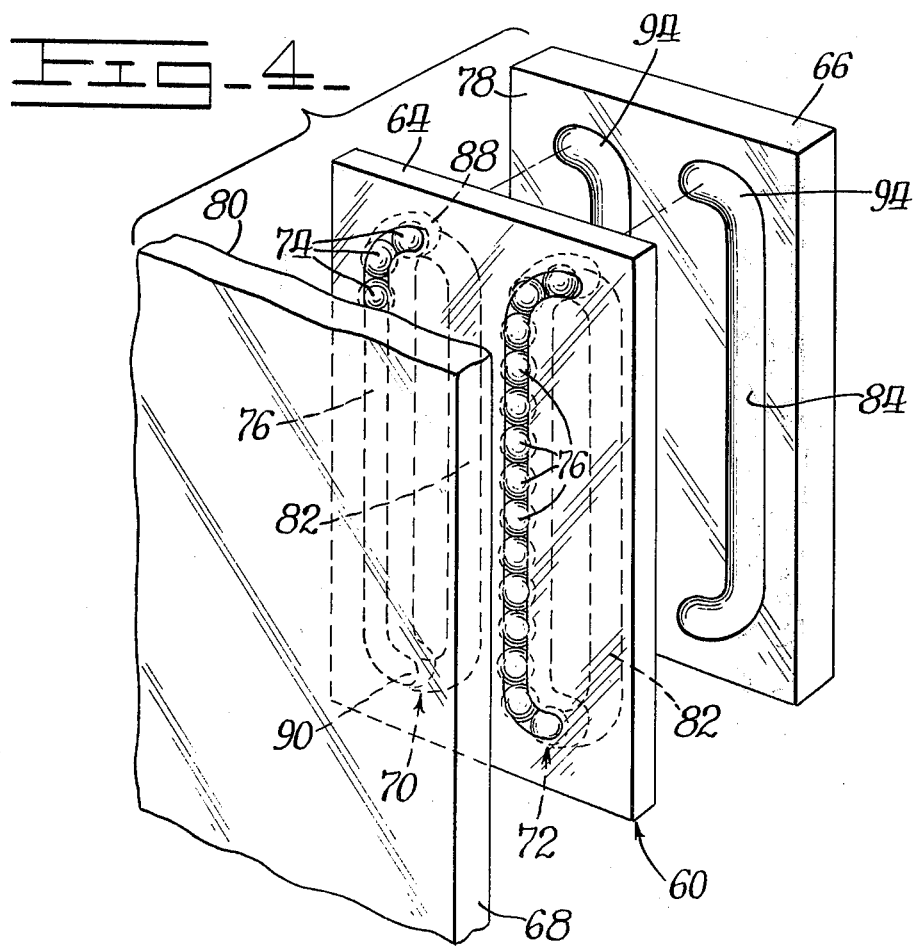

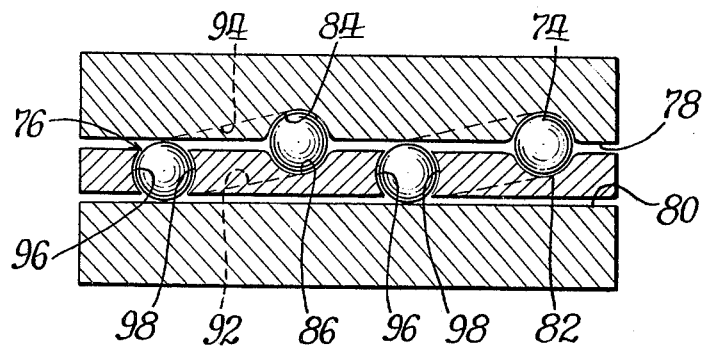
Fig_5_
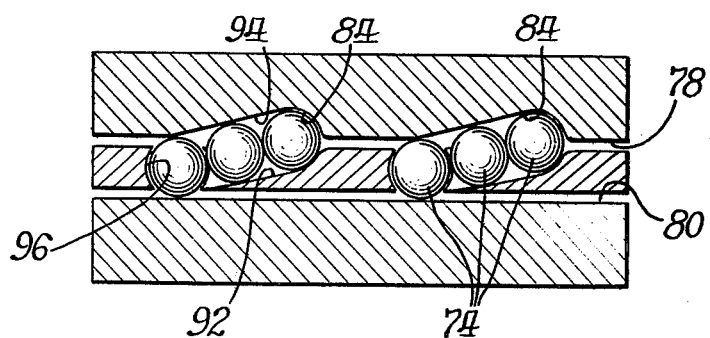
Fig_6_
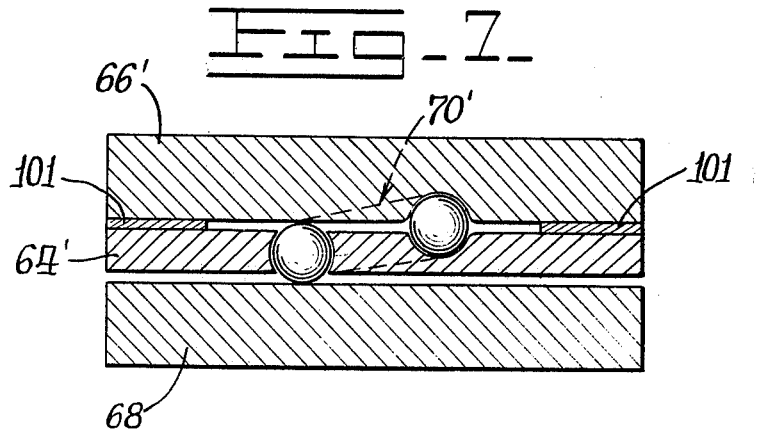
Fig_7_

RECIRCULATING BALL BEARING ASSEMBLY FOR FORK LIFT MAST UNITS

BACKGROUND OF THE INVENTION

The present invention relates to an anti-friction, recirculating ball bearing assembly of minimum thickness and more particularly to such an assembly employed within a mast unit for fork lift trucks.

It is common practice to employ bearing assemblies of different configurations for arrangement between the relatively movable upright sections of a mast unit or between other elongated elements intended for movement relative to each other in generally closely spaced apart relation. For example, U.S. Pat. No. 3,061,046 discloses the use of endless roller chains as anti-friction means between relatively movable mast sections.

Generally, it is desirable to employ anti-friction type bearings in order to facilitate relative movement between the upright sections of the mast unit while minimizing wear and reducing undesirable noise. However, at the same time, it is also important to provide an anti-friction bearing assembly of minimum thickness in order to permit installation of the bearing assemblies between the nested beams of the various upright sections which are commonly arranged in closely spaced apart pairs.

The general use and construction of anti-friction, recirculating ball bearing assemblies is also well demonstrated in the prior art by a great number of references. Such an antifriction, recirculating ball bearing assembly contemplated as having a generally reduced thickness may be seen, for example, in U.S. Pat. Nos. 3,767,276 and 3,843,215. However, these bearing assemblies are specifically configured for use in conjunction with a circular shaft movable within a cylindrical sleeve.

SUMMARY OF THE INVENTION

Accordingly, it is an object of the present invention to provide an anti-friction ball bearing assembly of minimum thickness.

It is another object of the invention to provide such an anti-friction recirculating ball bearing assembly for use between relatively movable upright sections in a fork lift mast unit.

It is still another object of the invention to provide such an anti-friction, recirculating ball bearing assembly employable either in fork lift mast units or in other applications wherein the bearing assemblies are arrangable between relatively movable elements having parallel, facing surfaces.

The minimum thickness for the present anti-friction, recirculating ball bearing assembly is accomplished through the use of a bearing carrier plate arranged adjacent at least one race member having a substantially flat bearing surface to form one or more closed loop paths of elongated configuration. A straight line, bearing portion of each path penetrates entirely through the bearing carrier plate while another straight line, recirculating portion of each path is formed partially by the bearing carrier plate and partially by the bearing surface of the one race member.

Additional objects and advantages of the invention are made apparent below having reference to the accompanying drawings.

DESCRIPTION OF THE DRAWINGS

FIG. 2A is a view similar to FIG. 2 while being taken through a bottom portion of the mast unit of FIG. 1.

FIG. 3 is a view similar to FIG. 2, in that it is a section view through a top portion of the mast unit, while illustrating another embodiment of the present anti-friction, recirculating ball bearing assembly.

FIG. 3A is similar to FIG. 2A in that it is a section view through a bottom portion of the mast unit while including the same bearing assembly embodiment as FIG. 3.

FIG. 4 is an exploded view of the bearing assembly also shown in FIGS. 2 and 2A to better illustrate construction and assembly of its components.

FIG. 5 is a sectioned view of a bearing assembly of the type illustrated in FIGS. 2 and 2A, taken generally through a mid-portion of the elongated circulating path for the ball bearings in the assembly.

FIG. 6 is a sectioned view similar to FIG. 5 except that it is taken at one end of the elongated closed loop paths in order to more clearly illustrate formation of their curved end sections by the bearing carrier plate and one of the race members.

FIG. 7 is a sectioned view also similar to FIG. 5 while illustrating yet another embodiment of the present bearing assembly.

DESCRIPTION OF THE PREFERRED EMBODIMENTS

The anti-friction, recirculating ball bearing assembly of the present invention is contemplated for use in any application where it is desirable to provide such an assembly between relatively movable elements with minimum spacing therebetween. The mast unit of a fork lift truck is particularly contemplated as one application for the bearing assembly. Accordingly, a fork lift truck including a typical mast unit is illustrated in FIG. 1.

The bearing assembly of the present invention is employable in other types of mast units as well and even within a variety of locations upon such a mast unit. However, as noted above, the bearing assembly is particularly contemplated for arrangement between the relatively movable upright sections of the mast unit. Accordingly, a brief description of the fork lift mast unit of FIG. 1 is set forth below sufficient to permit an understanding of this preferred application for the bearing assembly.

Figure 1:
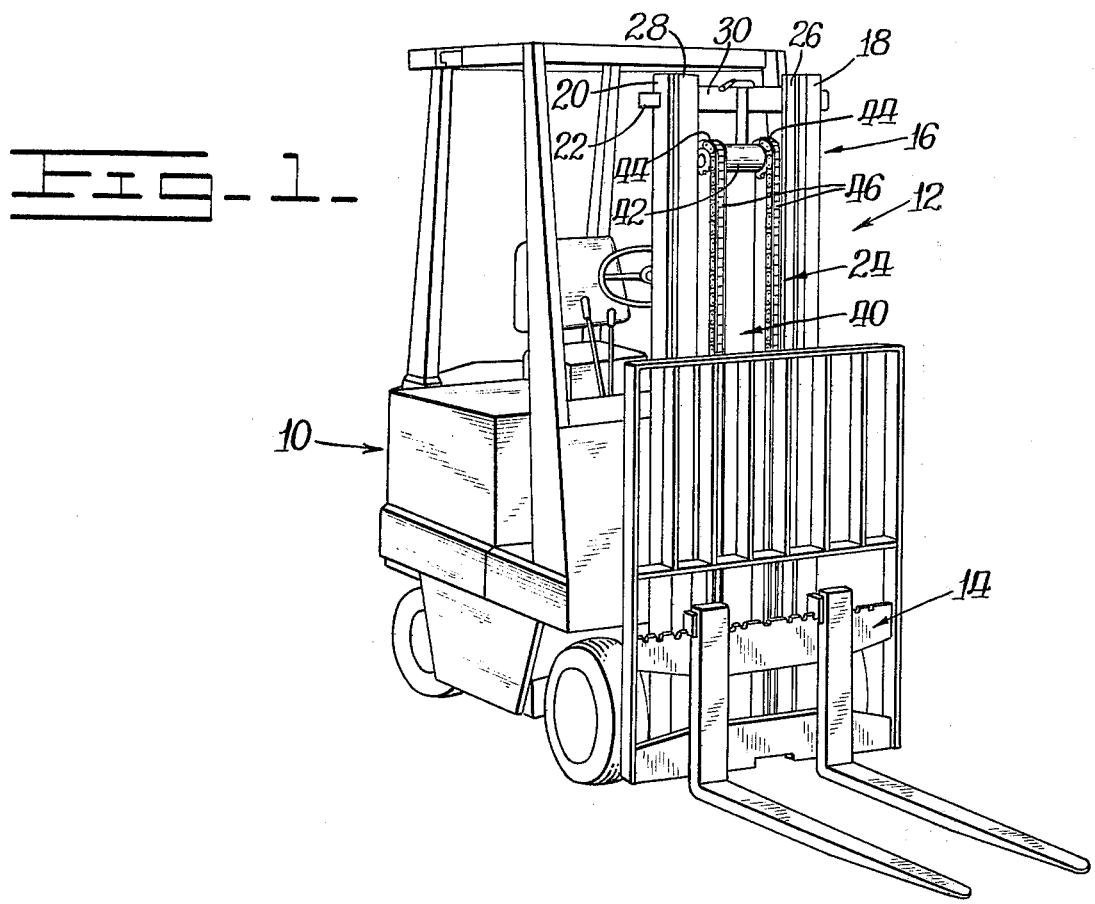
FIG. 1 is an isometric view of a fork lift truck including a typical mast unit wherein the present anti-friction, recirculating ball bearing assembly may be employed.

The fork lift truck generally indicated at 10 in FIG. 1 includes a mast unit 12 which is selectively operable for raising and lowering a carriage indicated at 14.

Figure 2:
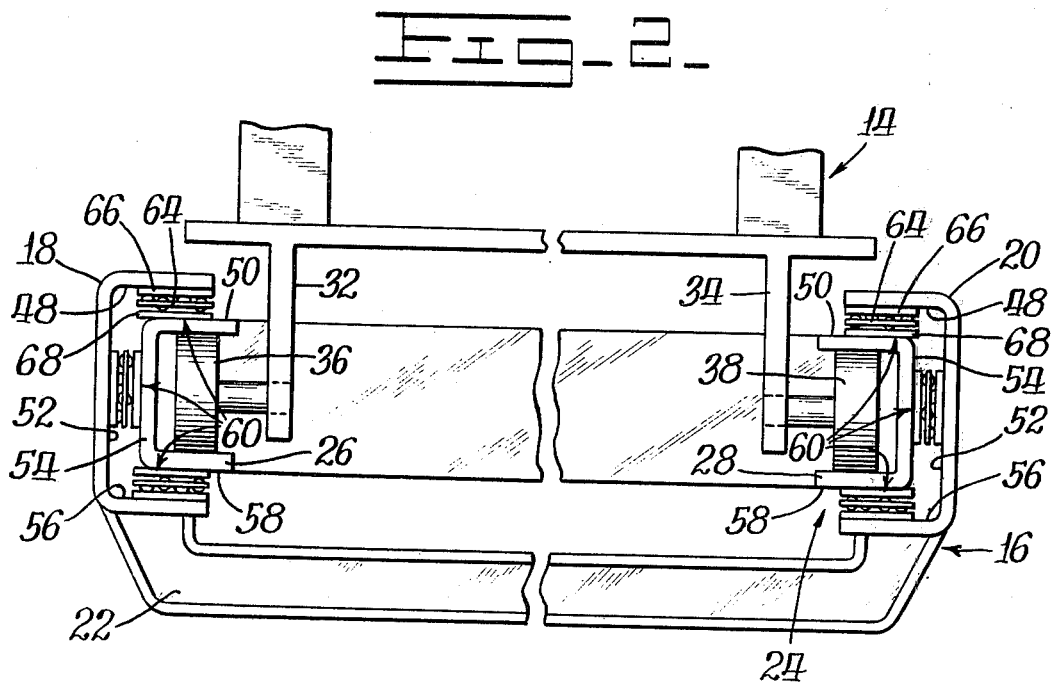
FIG. 2 is a view taken in section through a top portion of the mast unit of the fork lift truck for FIG. 1 to illustrate a plurality of the bearing assemblies arranged between its relatively movable upright sections.

Referring also to one of the sectioned views, FIG. 2, for example, the mast unit 12 includes a fixed upright section 16 including a pair of structural beams 18 and 20 which are secured in spaced apart relation by cross pieces such as that indicated at 22.

A movable upright section 24 also includes a pair of structural beams 26 and 28 which are secured together in spaced apart relation by cross pieces such as that indicated at 30.

Referring particularly to FIG. 2, the carriage 14 includes a pair of beams 32 and 34 which are nested between the movable upright beams 26 and 28 while being supported for movement relative thereto by rollers indicated at 36 and 38.

Movement of the inner upright section 24 relative to the fixed upright section 16 and movement of the carriage 14 relative to the inner upright section 24 is accomplished by a conventional hydraulic jack of the type indicated at 40 in FIG. 1. The jack 40 includes an extendable header 42 secured to the cross piece 30 and supporting two rotatable sheaves 44. Lift chains 46 are trained over the sheaves, one end of each chain being secured to the carriage 14 and the other end secured to a structural portion of the fixed upright section 16. Accordingly, extension of the jack 40 causes the inner upright section 24 to be raised relative to the fixed upright section 16 while the carriage 14 is movable relative to both of the upright sections 16 and 24.

Because of considerable loads supported by the carriage during relative movement between the upright sections, it is desirable to provide anti-friction bearings between those sections in order to reduce wear and to minimize or eliminate undesirable noise.

Referring again particularly to FIG. 2, it may be seen that the beams for the fixed upright section and the movable upright section are arranged in adjacent, relatively movable pairs 18, 26 and 20, 28. Because of the nested arrangement for the adjacent pairs of beams, they have a number of opposed or facing surfaces, the opposed pairs of surfaces on each adjacent pair of beams 18, 26 or 20, 34 being indicated respectively at 48, 50; 52, 54 and 56, 58.

The anti-friction, recirculating ball bearing assembly of the present invention is indicated at 60, a plurality of such bearing assemblies being arranged between the respective pairs of facing surfaces formed by the adjacent beams 18, 26 and 20, 28.

Referring also to FIG. 2A, it may be seen that a similar plurality of bearing assemblies 62 are arranged between the same pairs of surfaces upon the upright beams at the bottom of the mast unit. The detailed differences between the bearing assembly 60 and 62 are discussed further below. However, it may be seen in each of FIGS. 2 and 2A that the preferred arrangement of the bearing assembly 60 and 62 provides opposed pairs of bearing assemblies for completely supporting the inner or movable mast section 24 relative to the fixed mast section 16.

Construction of each bearing assembly 60 may be best seen, for example, by combined reference to each of FIGS. 4–6. Construction for each of the bearing assemblies 62 is also illustrated by these figures, the only difference between the bearing assemblies 60 and 62 lying in the relative length of their race members as described below.

Referring now particularly to FIGS. 4–6, the bearing assembly 60 basically comprises a bearing carrier plate 64 arranged between first and second race members or plates 66 and 68. The bearing carrier plate 64 together with the first race member 66 forms a pair of closed loop, recirculating paths, generally indicated at 70 and 72. Each of the paths 70 and 72 is filled with a number of ball bearings having uniform diameters greater than the thickness of the bearing carrier plate 64. A number of the ball bearings are indicated at 74. The two closed loop paths 70 and 72 are of similar construction and are intended to provide increased bearing support because of the parallel configuration of the race members 66 and 68. A detailed description of the closed loop path 70 is set forth below. The other closed loop path 70 is set forth below. The other closed loop path 72 is of similar construction.

The closed loop path 70 includes a straight line, bearing portion 76 which penetrates entirely through the bearing carrier plate 64 so that ball bearings moving along that portion of the closed loop path may be in simultaneous engagement with flat bearing surfaces 78 and 80 formed respectively upon the race members 66 and 68.

An additional straight line recirculating portion 82 of the closed loop path is formed by elongated concave slots 84 and 86 defined upon the flat bearing surface 78 of the first race member 66 and the adjacent surface of the bearing carrier plate 64. These straight line portions of each closed loop path may be best seen in the cross-sectional view of FIG. 5.

The closed loop path 70 also includes two curved end portions 88 and 90 which are formed in combination by the bearing carrier plate 64 and the first race member 66. Referring also to the cross-sectional view of FIG. 6, it may be seen that each such end portion of the closed loop path is formed by tapered slots defined in the facing surfaces of the bearing carrier plate 64 and the first race member 66. The tapered configuration of the slots forms the end portions 88 and 90 for planar alignment between the offset straight line bearing portions 76 and 82. The tapered grooves formed in the bearing carrier plate 64 and the first race member 66 are indicated respectively at 92 and 94 in FIGS. 4 and 6.

During operation of the bearing assembly, the bearing carrier plate 64 remains in fixed alignment relative to the first race member 66 and is preferably secured thereto by means not shown. The second race member 68 is then arranged for movement relative to the bearing carrier plate 64, the ball bearings 74 in the two closed loop paths providing planar support between the two race members.

During certain portions of operation, the bearing carrier plate 64 may pass out of engagement or register with the second race member 68. Accordingly, the bearing carrier plate 64 is preferably configured to insure that the ball bearings 74 are retained within the respective closed loop paths 70 and 72. As may be best seen, for example, in FIG. 5, the bearing path portion 76 which penetrates through the bearing carrier plate 64 is formed by concave edges 96 and 98. The end portions 88 and 90 are similarly configured at least where the end portions penetrate through the bearing carrier plate 64.

Each closed loop path is formed with a circular cross-section along its entire length which is of a size to permit rolling movement of the ball bearings 74 in conventional fashion.

Minimum thickness is achieved in that the spacing between the bearing surfaces 78 and 80 is limited to the diameter of the ball bearings 74. An even further reduction in thickness for an anti-friction, recirculating ball bearing assembly according to the present invention is achieved by the embodiment illustrated in FIGS. 3 and 3A.

The top mounted bearing assemblies of FIG. 3 are indicated at 60' while the bottom mounted bearing assemblies of FIG. 3A are indicated at 62'. The components for these bearing assemblies are similarly indicated by primed numerals corresponding to those set forth above for portions of the bearing assemblies 60 and 62.

In general, the construction of the bearing carrier plate 64' and the first race member 66' corresponds with the preceeding description with the bearing carrier plate 64 and the first race member 66. The main difference is that the FIGS. 3 and 3A embodiments do not employ a second race member such as that indicated at 68. Rather, a flat bearing surface is formed upon one of the relatively movable elements between which each bearing assembly is arranged. This feature of the FIGS. 3 and 3A embodiment is described in greater detail below.

Referring again momentarily to FIGS. 2 and 2A, it may be seen that each of the top mounted bearing assemblies 60 has the first race member secured to one of the facing surfaces upon the fixed beams 18 and 20. The second race member which is designed for movement relative to the bearing carrier plate 64 is secured to the facing surfaces formed by the movable beams 26 and 28. The second face members 68 extend substantially along the length of the beams 26 and 28 generally from the bottom of the mast unit to its top as best seen in FIG. 1. Thus, as the inner mast section 24 moves upwardly relative to the fixed upright section 16, the beams 26 and 28 move beyond the upper ends of the fixed beams 18 and 20. The elongated construction of the second race members 68 provide continuing bearing engagement for the ball bearings 74.

Referring now to FIG. 2A, the bearing assemblies 62 are identical with the bearing assemblies 60 as described above except that the first race members 66 are secured to the facing surfaces for the movable beams 26 and 28. The second race members 68 extend substantially along the length of the facing surfaces for the fixed beams 18 and 20. Thus, as the lower ends of the beams 26 and 28 move upwardly through the fixed upright section 16, the ball bearings 74 tend to remain in bearing engagement with the elongated second race member 68.

The bearing assemblies 60' and 62' are similarly arranged upon the mast unit, as illustrated in FIGS. 3 and 3A, in the same manner as described above for bearing assemblies 60 and 62. The only difference is that second race members such as those indicated at 68 in FIGS. 2 and 2A are not secured to the facing surfaces of the movable beams 26 and 28 in FIGS. 3 nor to the facing surfaces of the fixed beams 18 and 20 in FIG. 3A. Rather, the facing surfaces are formed or finished to provide a substantially flat bearing surface for direct bearing engagement with the ball bearings 74.

The bearing assembly of FIG. 7 varies from that shown in FIGS. 4–6 primarily in the addition of a spacer plate 101 and the formation of only a single closed loop bearing path indicated at 70'. This embodiment demonstrates that only a single bearing path is necessary when the carrier plate 64' is stably secured to the first race member 66'. Here, both the carrier plate 64' and the spacer plate 101 may be secured to the first race member 66' for example by means of a weldment or screws (not shown).

In connection with the FIG. 7 embodiment, it is to be noted that the carrier plate 64' might also be secured in direct abutting engagement with the first race member 66'. The carrier plate 64' and the first race member 66', either with or without the spacer plate 101, could be preassembled and mounted on the proper mast section as a unitary structure or assembly.

It will also be apparent that the first race member, either as indicated at 66 in FIGS. 2, 2A and 4–6 or at 66' in FIGS. 3, 3A and 7, could be integrally formed directly by the appropriate mast section or relatively movable element.

I claim:

1. In a fork lift mast unit including a first upright section having a pair of spaced apart, elongated, structural beams and a second upright section being movable relative to the first upright section and having spaced apart, elongated, structural beams, each beam in the second upright section being arranged adjacent one of the beams in the first upright section, the pairs of adjacent beams having elongated surfaces arranged in substantially parallel, facing relation with each other, a plurality of similar anti-friction, recirculating ball bearing assemblies of minimum thickness arranged between the facing elongated surfaces of the adjacent beams, each ball bearing assembly comprising a first race member secured to one of the facing surfaces of the adjacent beams, the first race member having a substantially flat bearing surface, a second race member being mounted upon the opposite face of the other adjacent beam for movement relative to the first beam, the second race member having a flat bearing surface in facing relation with the flat bearing surface of the first race member, a bearing carrier plate arranged between the flat bearing surfaces of the race members, the bearing carrier plate forming a pair of closed loop paths of elongated configuration in combination with one of the race members, each of the closed loop paths having a straight line, bearing portion penetrating entirely through the bearing carrier plate, another straight line, recirculating path portion being formed partially by the bearing carrier plate and partially by the bearing surface of the one race member and curved end portions formed partially by the bearing carrier plate and partially by the one race member to complete the closed loop path with a planar configuration in combination with the two straight line path portions, and a plurality of ball bearings each having a diameter greater than the thickness of the bearing carrier plate and substantially filling each of the closed loop paths.

2. The fork lift mast unit of claim 1 wherein the beams of the second upright section are nested within the beams for the first upright section, each pair of adjacent beams having a plurality of facing elongated surfaces, one of the ball bearing assemblies being arranged between each set of facing surfaces formed by the nested beams.

3. The fork lift mast unit of claim 2 wherein the recirculating ball bearing assemblies are arranged both at the top and bottom of the adjacent beams, the first race member for each of the top mounted ball bearing assemblies being secured to one of the first upright section beams which is relatively fixed against upward movement, the first race member for each of the bottom mounted ball bearing assemblies being secured to the second upright section beam which is upwardly movable relative to the first upright section beam.

4. The fork lift mast unit of claim 3 wherein the flat bearing surface formed by each of the second race members extends substantially along the length of the beam to which it is secured.

5. The fork lift mast unit of claim 4 wherein each of the bearing carrier plates includes means for retaining the ball bearings within their respective closed loop paths.

6. The fork lift mast unit of claim 5 wherein the bearing portion of each closed loop path is defined by concave edges formed on the bearing carrier plate, the recirculating path portion for each closed loop path being defined by aligned concave slots formed on the bearing surface of the one race member and the adjacent surface of the bearing carrier plate, the end portions of the closed loops being defined by tapered slots formed in both the bearing carrier plate and the one race member.

7. The fork lift mast unit of claim 1 wherein the recirculating ball bearing assemblies are arranged both at the top and bottom of the adjacent beams, the first race member for each of the top mounted ball bearing assemblies being secured to one of the first upright section beams which is relatively fixed against upward movement, the first race member for each of the bottom mounted ball bearing assemblies being secured to the second upright section beam which is upwardly movable relative to the first upright section beam, the second race members being secured to the opposite beams from those upon which the first race members are secured, the flat bearing surfaces formed by the second race members extending substantially along the entire length of the beams to which they are secured.

8. The fork lift mast unit of claim 1 wherein each of the bearing carrier plates includes means for retaining the ball bearings within their respective closed loop paths.

9. The fork lift mast unit of claim 8 wherein the bearing portion of each closed loop path is defined by concave edges formed on the bearing carrier plate, the recirculating path portion for each closed loop path being defined by aligned concave slots formed on the bearing surface of the one race member and the adjacent surface of the bearing carrier plate, the end portions of the closed loops being defined by tapered slots formed in both the bearing carrier plate and the one race member.

10. In a fork lift mast unit including a first upright section having a pair of spaced-apart, elongated, structural beams and a second upright section being movable relative to the first upright section and having a pair of spaced-apart, elongated, structural beams, each beam in the second upright section being arranged adjacent one of the beams in the first upright section, the adjacent pairs of beams having elongated surfaces arranged in substantially parallel, facing relation with each other, the elongated surface upon one of the adjacent beams being a substantially flat bearing surface, a plurality of similar anti-friction, recirculating ball bearing assemblies of minimum thickness being arranged between the facing elongated surfaces of the adjacent beams, each ball bearing assembly comprising a race member secured to the facing surface of the other adjacent beam, the race member having a substantially flat bearing surface, a bearing carrier plate arranged between the flat bearing surface of the race member and the flat bearing surface of the one beam, the bearing carrier plate forming a closed loop path of elongated configuration in combination with the race member, the closed loop path having a straight line, bearing portion penetrating entirely through the bearing carrier plate, another straight line, recirculating path portion being formed partially by the bearing carrier plate and partially by the bearing surface of the race member and curved end portions formed partially by the bearing carrier plate and partially by the race member to complete the closed loop path with a planar configuration in combination with the two straight line path portions, and a plurality of ball bearings of uniform diameter greater than the thickness of the bearing carrier plate and substantially filling the closed loop path, the bearing carrier plate including means for retaining the ball bearings within the closed loop path between the race member and the bearing carrier plate.

11. The fork lift mast unit of claim 10 further comprising means for supporting the bearing carrier plate in fixed relation to the race member.

12. The fork lift mast unit of claim 11 wherein the recirculating ball bearing assemblies are arranged both at the top and bottom of the adjacent pairs of beams, the race member for each of the top mounted ball bearing assemblies being secured to one of the first upright section beams which is relatively fixed against upward movement, the race member for each of the bottom mounted ball bearing assemblies being secured to the second upright section beam which is upwardly movable relative to the first upright section beam, each of the adjacent beams having a substantially flat bearing surface extending substantially along its length.

13. The fork lift mast unit of claim 12 wherein each of the bearing carrier plates includes means for retaining the ball bearings within the respective closed loop paths for the plurality of bearing assemblies.

14. The fork lift mast unit of claim 13 wherein the bearing portion of the closed loop path in each assembly is defined by concave edges formed on the bearing carrier plate, the recirculating path portion for each closed loop path being defined by aligned concave slots formed on the bearing surface of the race member and the adjacent surface of the bearing carrier plate, the end portions of the closed loops being defined by tapered slots formed in both the bearing carrier plate and the race member.

15. The fork lift mast unit of claim 14 wherein the bearing carrier plate and race member of each bearing assembly form in combination a pair of closed loop bearing paths containing ball bearings.

16. In a fork lift mast unit including a first upright section having a pair of spaced-apart, elongated, structural beams and a second upright section being movable upwardly in relation to the first upright section and having a pair of spaced-apart, elongated, structural beams, each beam in the second upright section being arranged adjacent one of the beams in the first upright section, the adjacent pairs of beams having elongated flat bearing surfaces arranged in substantially parallel, facing relation with each other, a plurality of similar anti-friction, recirculating ball bearing assemblies of minimum thickness being arranged between the facing surfaces of the adjacent beams, each ball bearing assembly comprising a race member having a substantially flat bearing surface, one race member being secured to an upper portion of the facing surface for the adjacent beam which is a portion of the first upright section, another race member for an additional ball bearing assembly being arranged upon a lower portion of the facing surface for the other beam which is a portion of the upwardly movable second upright section, each of the ball bearing assemblies also comprising
a bearing carrier plate arranged between the flat bearing surface of each race member and the facing elongated bearing surface of the other adjacent beam, the bearing carrier plate forming a pair of closed loop paths of elongated configuration in combination with the respective race member, each of the closed loop paths having a straight line, bearing portion penetrating entirely through the bearing carrier plate, another straight line, recirculating path portion being formed partially by the bearing carrier plate and partially by the bearing surface of the respective race member and curved end portions formed partially by the bearing carrier plate and partially by the respective race member to complete the closed loop path with a planar configuration in combination with the two straight line path portions, and a plurality of ball bearings each having a diameter greater than the thickness of the bearing carrier plate and substantially filling each of the closed loop paths, each bearing carrier plate including means for retaining the ball bearings within the closed loop paths formed between the respective race member and the bearing carrier plate.

17. The fork lift mast unit of claim 16 wherein the bearing portion of each closed loop path is defined by concave edges formed on the bearing carrier plate, the recirculating path portion for each closed loop path being defined by aligned concave slots formed on the bearing surface of the race member and the adjacent surface of the bearing carrier plate, the end portions of the closed loops being defined by tapered slots formed in both the bearing carrier plate and the race member.

18. The fork lift mast unit of claim 17 wherein the beams of the second upright section are nested within the beams for the first upright section, the plurality of similar, anti-friction, recirculating ball bearing assemblies being arranged in opposed pairs in order to support the second upright section during its movement relative to the first upright section.

19. An anti-friction, recirculating ball bearing assembly of minimum thickness, comprising
a first race member having a substantially flat bearing surface,
a second race member being movable relative to the first race member and having a flat bearing surface in substantially parallel relation with the flat bearing surface of the first race member,
a bearing carrier plate arranged between the flat bearing surfaces of the race members, the bearing carrier plate forming a pair of closed loop paths each of elongated configuration in combination with one of the race members, each of the closed loop paths having a straight line, bearing portion penetrating entirely through the bearing carrier plate, another straight line, recirculating path formed partially by the bearing carrier plate and partially by the bearing surface of the one race member and curved end portions formed partially by the bearing carrier plate and partially by the race member to complete the closed loop path with a planar configuration in combination with the two straight line path portions, and a plurality of ball bearings each having a diameter greater than the thickness of the bearing carrier plate to substantially fill each of the closed loop paths.

20. The anti-friction, recirculating ball bearing assembly of claim 19 wherein the bearing carrier plate includes means for retaining the ball bearings within their respective closed loop paths.

21. The anti-friction, recirculating ball bearing assembly of claim 20 wherein the bearing portion of each closed loop path is defined by concave edges formed on the bearing carrier plate, the recirculating path portion for each closed loop path being defined by aligned concave slots formed on the bearing surface of the one race member and the adjacent surface of the bearing carrier plate, the end portions of the closed loops being defined by tapered slots formed in both the bearing carrier plate and the one race member.

22. An anti-friction, recirculating ball bearing assembly of minimum thickness suitable for movable arrangement relative to an elongated element including means forming a flat bearing surface, comprising
a race member having a substantially flat bearing surface,
a bearing carrier plate arranged adjacent the flat bearing surface of the race member and suitable for arrangement upon its other side adjacent the bearing surface of the elongated element, the bearing carrier plate forming a closed loop path of elongated configuration in combination with the race member, the closed loop path having a straight line, bearing portion penetrating entirely through the bearing carrier, another straight line, recirculating path being formed partially by the bearing carrier plate and partially by the bearing surface of the one race member and curved end portions formed partially by the bearing carrier plate and partially by the race member to complete the closed loop path with a planar configuration in combination with the two straight line path portions, and
a plurality of ball bearings each having a diameter greater than the uniform thickness of the bearing carrier to substantially fill the closed loop path,
the bearing carrier plate including means for retaining the ball bearings within the closed loop path between the race member and the bearing carrier plate.

23. The anti-friction, recirculating ball bearing assembly of claim 22 wherein the bearing portion of the closed loop path is defined by concave edges formed on the bearing carrier plate, the recirculating path portion for the closed loop path being defined by aligned concave slots formed on the bearing surface of the race member and the adjacent surface of the bearing carrier plate, the end portions of the closed loop path being defined by tapered slots formed in both the bearing carrier plate and the race member.

24. The anti-friction, recirculating ball bearing assembly of claim 23 wherein the bearing carrier plate and race member form a pair of similar closed loop paths containing ball bearings.

25. The anti-friction, recirculating ball bearing assembly of claim 22 wherein the bearing carrier plate is fixed relative to the race member.

* * * * *